O. W. HART.
ROLLER BEARING.
APPLICATION FILED JAN. 20, 1916.
1,205,449.
Patented Nov. 21, 1916.
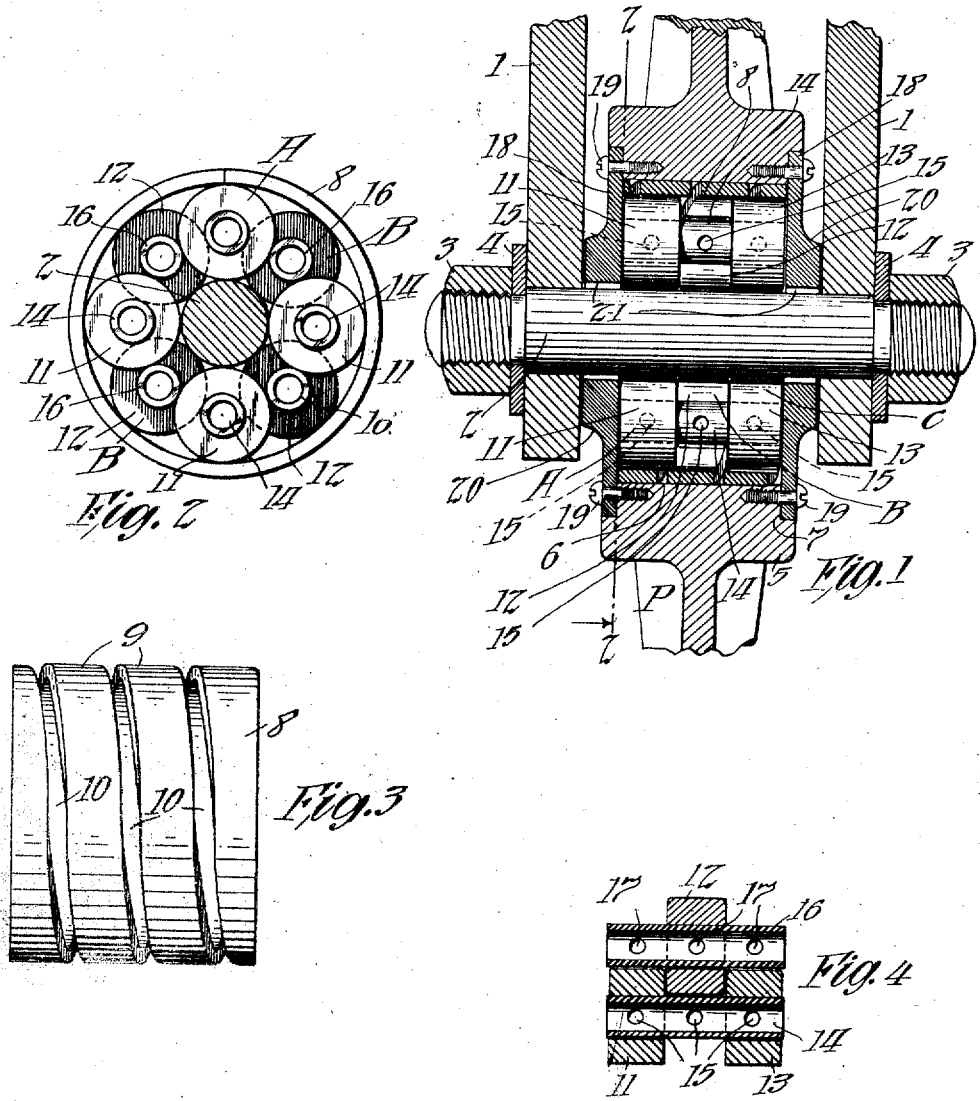
Witnesses:
Caballero
Frederick Bachmann
Inventor:
Orlando W. Hart
by William A. Hardy
his Atty

UNITED STATES PATENT OFFICE.

ORLANDO W. HART, OF FALL RIVER, MASSACHUSETTS.

ROLLER-BEARING.

1,205,449.

Specification of Letters Patent.

Patented Nov. 21, 1916.

Application filed January 20, 1916. Serial No. 73,167.

*To all whom it may concern:*

Be it known that I, ORLANDO W. HART, a citizen of the United States, and a resident of Fall River, Bristol county, Massachusetts, have invented certain new and useful Improvements in Roller-Bearings, of which the following is a description.

My invention relates to roller bearings and especially to roller bearings designed for taking up heavy and unevenly distributed loads and where the liability of the bearings to wear and become untrue and otherwise damaged is great.

The principal object of my invention is to provide an improved roller bearing designed for use between two relatively rotatable members, one supporting the other, whereby it is possible to obtain circumferentially of the bearing a greater number of points of contact, or points where the load or pressure is communicated from one of said relatively rotatable members to the other, than in most, if not all, types of roller bearings now used, and wherein the necessity of employing the usual keepers or races for maintaining the rolls properly assembled in the bearing is obviated.

Another object of my invention is to provide a construction for securing a more even distribution of the load on the rolls of the bearing, and wherein, should the load or strain be greater on certain points or on certain rolls of the bearing than on others, no harmful effects will result.

A further object of my invention is to provide a roller bearing which shall be simple in construction and economical to manufacture, which may be quickly and readily assembled and taken apart, and in which should any part become broken or otherwise damaged, the same may be readily replaced.

My invention also contemplates an improved arrangement and construction of the parts of the bearing, preferably including an improved casing or bearing sleeve for containing the rolls, whereby very effective lubrication of all parts of the bearing may be obtained and whereby it is seldom necessary to renew or replenish the lubricant.

Other objects and features of my invention reside in the construction of parts and combinations of elements hereinafter more fully described and claimed.

For a clearer understanding of my invention, attention is directed to the accompanying drawing forming a part of this specification, in which the same parts are designated by like reference characters in the several views, and in which:

Figure 1 is a sectional view through the hub of a wheel or pulley rotatably mounted on a fixed shaft, which hub is provided with a roller bearing in accordance with my invention; Fig. 2 is a sectional view taken on line 2—2 of Fig. 1, the wheel or pulley being omitted; Fig. 3 is a view in side elevation of the casing or bearing sleeve in which the rolls of the bearing shown in Figs. 1 and 2 are mounted; and Fig. 4 is a detailed sectional view showing the manner in which the adjacent series of rolls of the bearing are assembled.

Referring to the drawing, reference characters 1, 1 represent a pair of spaced hangers in which is mounted a cylindrical shaft or stud 2. The end portions of the shaft 2, which extend beyond the hangers 1, 1, are reduced and have threaded thereon the nuts 3, 3, to hold the shaft 2 in place. Washers 4, 4 are preferably respectively disposed on the shaft 2 between the nuts 3, 3 and hangers 1, 1.

Reference character P represents a wheel or sheave which is rotatably mounted on the shaft 2 between the hangers 1, 1, the hub 5 of the wheel P being provided with an enlarged cylindrical opening 6, through which the shaft 2 extends. The hub 5 is preferably annularly recessed about the ends of opening 6, as shown at 7, for a purpose which will presently appear.

My improved roller bearing is carried by the hub 5 and preferably comprises a plurality of series of rolls disposed in the cylindrical opening 6 of the hub, which series are concentrically disposed relatively to the axis of the wheel P. The roller bearing as shown in the drawing is composed of three such series of rolls represented by reference characters A, B and C. The roller bearing is preferably mounted in a cylindrical casing or bearing sleeve 8, the latter being preferably composed of a helically wound resilient flat strip of hardened steel, or other suitable metal, with the adjacent convolutions 9 thereof preferably spaced as shown at 10. The sleeve or casing 8 is preferably turned and ground to the desired diameter, both inside and out and when not within the hub or removed therefrom the casing is maintained at or assumes such a size, by reason of its own resiliency or spring action, that its outside diameter slightly exceeds the diameter of opening 6 in the hub 5. To position the casing 8 within the hub 5, the casing is first twisted in opposite directions at its ends until its outside diameter is less than the diameter of opening 6, is next inserted within said opening, and is then released from the twisting force or action. The casing thereupon springs into tight frictional engagement with the wall of opening 6 in which position it is firmly maintained under its own tension. When the casing is so disposed within the hub 5 the distance between the inside of the casing and the shaft 2 is just sufficient to accommodate the rolls of the bearing. The ends of the casing are finished off square, as shown in Fig. 3, and the length thereof when in position within the hub 5, is preferably the same as the main portion of the opening 6 in said hub.

The cylindrical rolls of the series A, B and C are preferably all of the same size and are preferably formed of hardened steel or other very hard material. The rolls of each series are respectively rotatably mounted on shafts which coact with rolls of the adjacent series to maintain the rolls properly assembled in the bearing, as will presently appear. The same number of rolls are preferably employed in each of the series A, B and C, there being four such rolls in each of the series comprising the bearing shown in the drawing. The rolls of each series are equally spaced circumferentially of the bearing and are maintained in staggered relation with the rolls of any adjacent series. In the form of my invention illustrated, the rolls 11 of series A are respectively rotatably mounted on shafts 14, the rolls 12 of series B are respectively rotatably mounted on shafts 16, and the rolls 13 of series C are respectively rotatably mounted on the shafts 14 on which the rolls 11 of series A are mounted. The shafts 14 and 16 are each preferably approximately of the same length as the bearing, or the combined length of the series A, B and C, and all of said shafts are preferably of equal diameter, which is greater than the shortest distance between the peripheries of any pair of adjacent rolls in any series and preferably equal to one-half the diameter of the rolls. It is apparent that the shafts on which the rolls of each of the series A, B and C are mounted, respectively extend between and engage the peripheries of different pairs of the rolls in any adjacent series at points more remote from the axis of the bearing than the points in the peripheries of such pairs of rolls respectively which are nearest each other, or, in other words, at points, with respect to the axis of the bearing, beyond lines respectively joining the centers of such pairs of rolls. Consequently, by the coaction of the shafts and rolls of any two adjacent series, the rolls of such adjacent series are maintained in staggered relation and in properly assembled position in the bearing, and the collapsing of the rolls toward the axis of the bearing is prevented when the wheel P which carries the bearing is removed from the shaft 2. The bearing may be correctly designated a "floating" bearing, as the series of rolls A, B and C and the shafts 14 and 16 comprising the bearing are rotatable as a whole in the casing 8 and about the axis of wheel P. Moreover, each of the members 11, 12, 13, 14 and 16 is capable of rotary movement with respect to any one or more of the rest of these members. The shafts 14 and 16 are preferably formed of brass, bronze or similar material, are preferably hollow, and are also preferably perforated, as shown at 15 and 17 respectively.

Suitable means is provided for preventing any appreciable relative longitudinal movement of the series of rolls and of the rolls and shafts. This means preferably comprises a pair of plates 18 respectively secured, as by means of screws 19, to the ends of the hub 5 within the annular recesses 7. The plates 18 also serve to take up end thrusts imposed on the bearing and to maintain the latter within the opening 6 of the hub. The plates 18 are preferably provided with enlarged annular portions 20 which extend close to the hangers 1, 1 and prevent any appreciable lateral play between the wheel P and the hangers. The plates 18 are also provided with enlarged openings 21 through which the shaft 2 extends without engaging the walls thereof, whereby the wheel P is supported on shaft 2 only by the roller bearing.

When my improved roller bearing is in use, the spaces 10 between the convolutions 9 of the casing 8 and the hollow shafts 14 and 16 are preferably filled with grease, graphite or other lubricant, and by reason of the perforations 15 and 17 in the shafts and the relative arrangement of the parts of the bearing, a very effective distribution of the lubricant to all parts of the bearing is obtained. Moreover, this construction insures a very effective lubrication of all parts of the bearing for a very long period without renewal or replenishing of the lubricant.

The construction of the bearing described herein is very simple and economical, as the rolls and the shafts which comprise the principal parts of the bearing, may be quickly and readily made by automatic screw machines. Furthermore, the parts may be quickly and readily assembled in proper relative position within a hub or journal to form the completed bearing, and if any of the rolls or shafts become worn or otherwise damaged in use, the same may be easily removed and replaced.

By reason of the rolls in the adjacent series of my improved bearing being staggered, a greater number of bearing points is obtained, for rolls of a given size, both circumferentially of the bearing and longitudinally thereof, than in bearings as usually constructed. The number of such bearing points may, of course, be increased by increasing the number of series of rolls in the bearing. Also, by reason of the fact that the rolls and shafts comprising the bearing are capable of relative rotation, should there be any excess of load or strain on the rolls of any series or on any single roll, no appreciable twisting, torsional or other like damaging effect is imposed on the other parts of the bearing.

It is to be understood, of course, that my invention is not limited to the number of series of rolls, nor to the number of rolls in in each of such series, employed in the specific bearing illustrated and described herein, and is also subject to further modifications and changes in the size, form and arrangement of its parts without departing from the spirit of the invention and the scope of the appended claims.

Having now described my invention, what I claim and desire to protect by Letters Patent is as follows:—

1. In a roller bearing, a plurality of concentric series of rolls, each of the rolls being loosely mounted on a shaft, the rolls and shafts of each series respectively coöperating with the shafts and rolls of an adjacent series to prevent the collapsing of the rolls of any of said series toward the axis of the bearing.

2. A roller bearing, comprising a plurality of series of concentric rolls, all the rolls being rotatable about their axes respectively, and each of the series of rolls being rotatable about the axis of the bearing, each of the rolls of the bearing being loosely mounted on a member having rolling contact with rolls in another series to maintain the rolls in assembled position in the bearing.

3. A roller bearing, comprising a pair of concentric series of cylindrical rolls of equal size, the series of rolls each comprising equispaced rolls staggered with respect to the rolls of the other series, each of the rolls of the bearing being loosely mounted on a cylindrical shaft, all of said shafts being of the same diameter which is greater than the shortest distance between the peripheries of any two adjacent rolls of either series, the shafts of the rolls of each series respectively extending between different pairs of adjacent rolls of the other series.

4. A roller bearing comprising a plurality of concentric series of cylindrical rolls, the rolls of each series being equally spaced and staggered with respect to the rolls of any adjacent series, all of said rolls being respectively loosely mounted on shafts of equal diameter greater than the shortest distance between the peripheries of any two adjacent rolls of any series, the shafts of the rolls of each series respectively extending between different pairs of adjacent rolls of an adjacent series.

5. A roller bearing comprising a pair of concentric series of rolls, and hollow perforated shafts on which the rolls of each series are respectively rotatably mounted, the shafts of each series respectively directly engaging and coacting with different pairs of adjacent rolls of the other series to maintain the rolls in assembled position in the bearing.

6. A roller bearing comprising more than two concentric series of rolls, the rolls of each pair of adjacent series being staggered, shafts on which the corresponding pairs of rolls of the alternate series in the bearing are respectively rotatably mounted, the shafts of each pair of alternate series respectively directly engaging and coacting with different pairs of adjacent rolls in the series intermediate such pair of alternate series to maintain the rolls of the bearing in assembled position and to maintain the rolls of the adjacent series in staggered relation.

7. A roller bearing comprising a pair of concentric series of rolls, and hollow perforated shafts on which the rolls of each series are respectively rotatably mounted, the shafts of each series respectively directly engaging and coacting with different pairs of adjacent rolls of the other series to maintain the rolls of the pair of series in staggered relation.

8. A roller bearing comprising a plurality of rolls, each of said rolls being rotatably mounted on a rod or shaft, the rod or shaft on which each roll is mounted coacting with and directly engaging other of said rolls to maintain all the rolls in proper relative position in the bearing.

9. A roller bearing comprising a plurality of rolls, each of said rolls being rotatably mounted on a hollow perforated shaft, the shaft on which each roll is mounted coacting with other of said rolls to maintain all the rolls in proper relative position in the bearing.

10. A roller bearing comprising a plurality of rolls and shafts on which said rolls are respectively rotatably mounted, the shaft on which each roll is mounted being in contact with the peripheries of other of said rolls.

This specification signed and witnessed this 18th day of Jan., 1916.

ORLANDO W. HART.

Witnesses:
  J. UNGER,
  FREDERICK BACHMANN.